Figure 1:
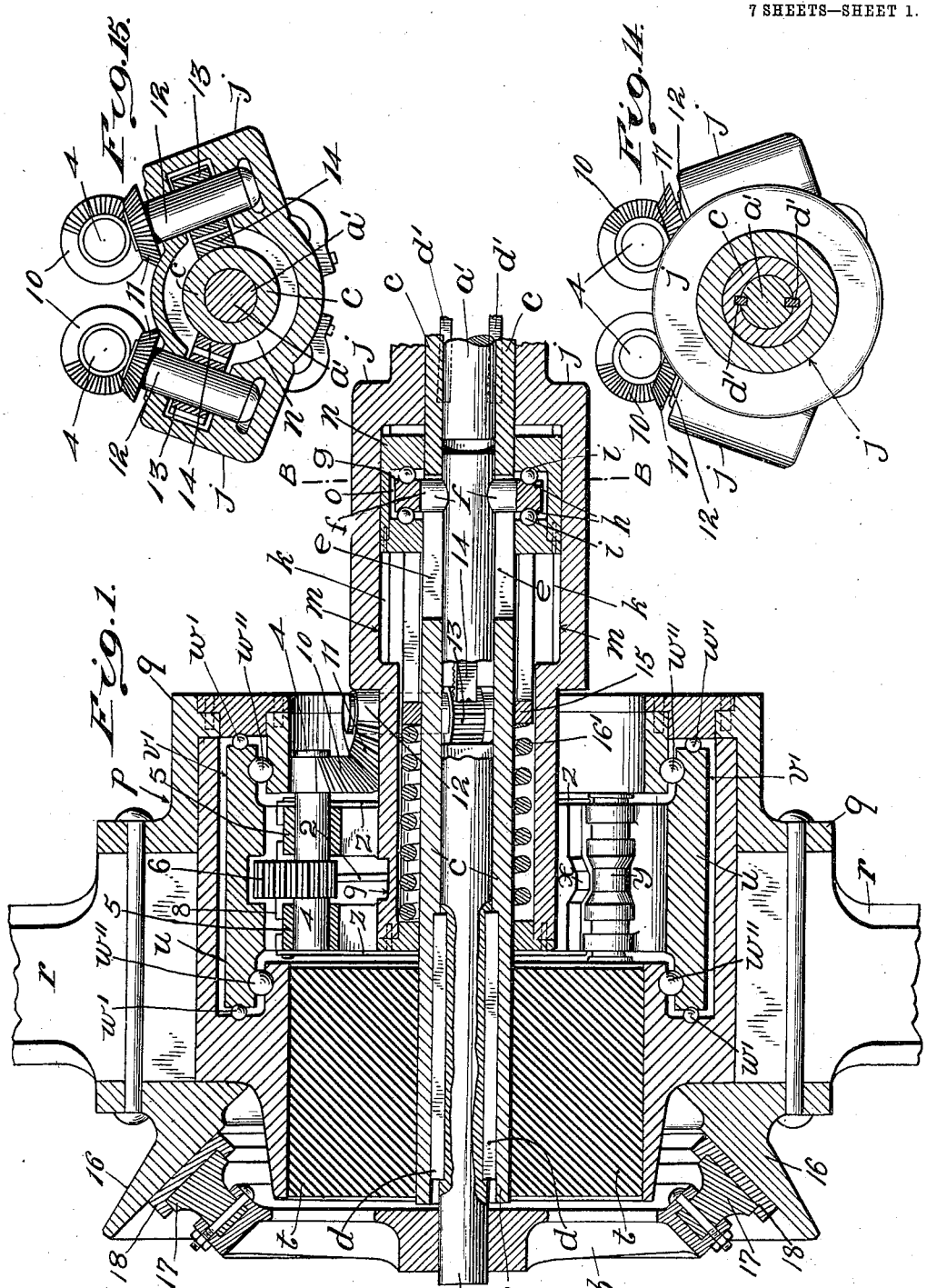

M. R. D'AMORA.
ROAD VEHICLE.
APPLICATION FILED SEPT. 1, 1909.

953,312.

Patented Mar. 29, 1910.
7 SHEETS—SHEET 1.

M. R. D'AMORA.
ROAD VEHICLE.
APPLICATION FILED SEPT. 1, 1909.

953,312.

Patented Mar. 29, 1910.
7 SHEETS—SHEET 3.

M. R. D'AMORA.
ROAD VEHICLE.
APPLICATION FILED SEPT. 1, 1909.
953,312.
Patented Mar. 29, 1910.
7 SHEETS—SHEET 4.
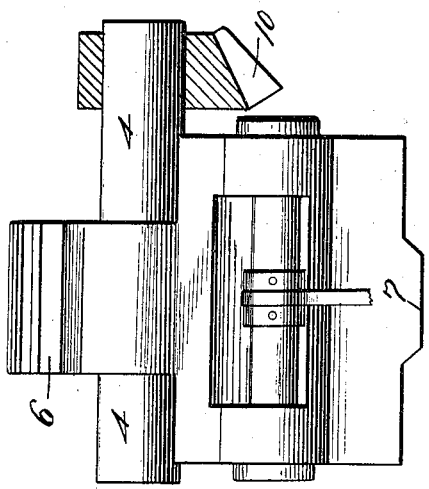
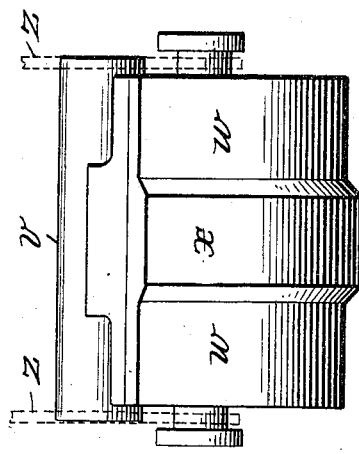
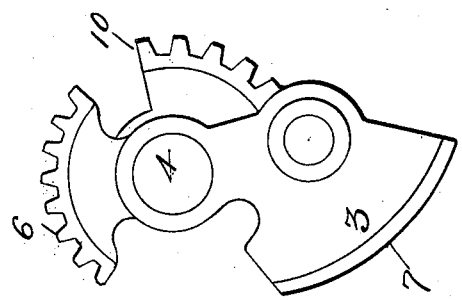
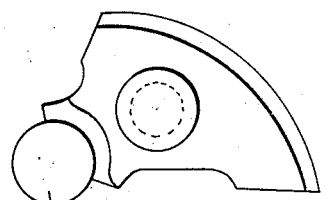
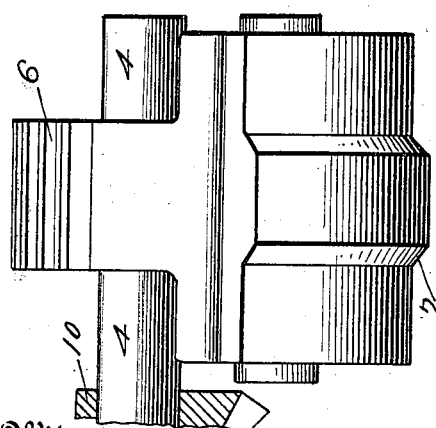
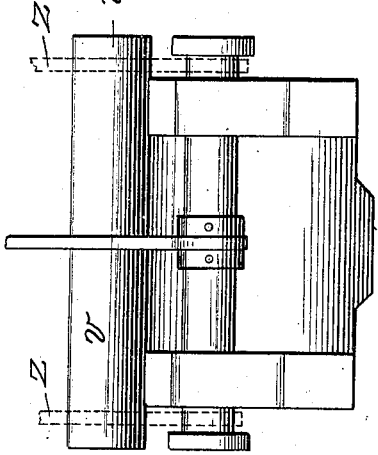
Witnesses:
Harry C. Hebig
Albert Hamilton
Matthew R. d'Amora Inventor
By his Attorney
James Hamilton

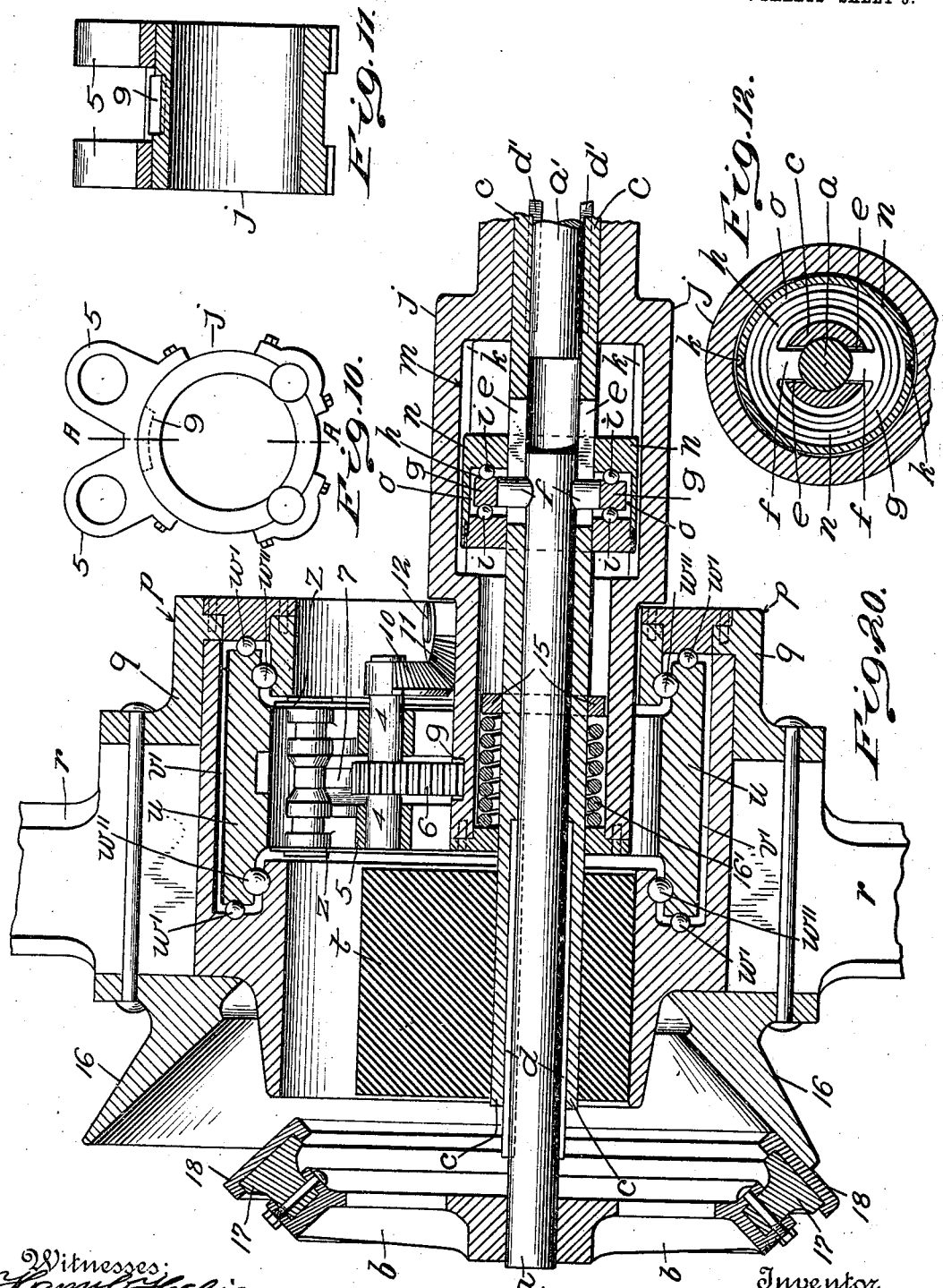

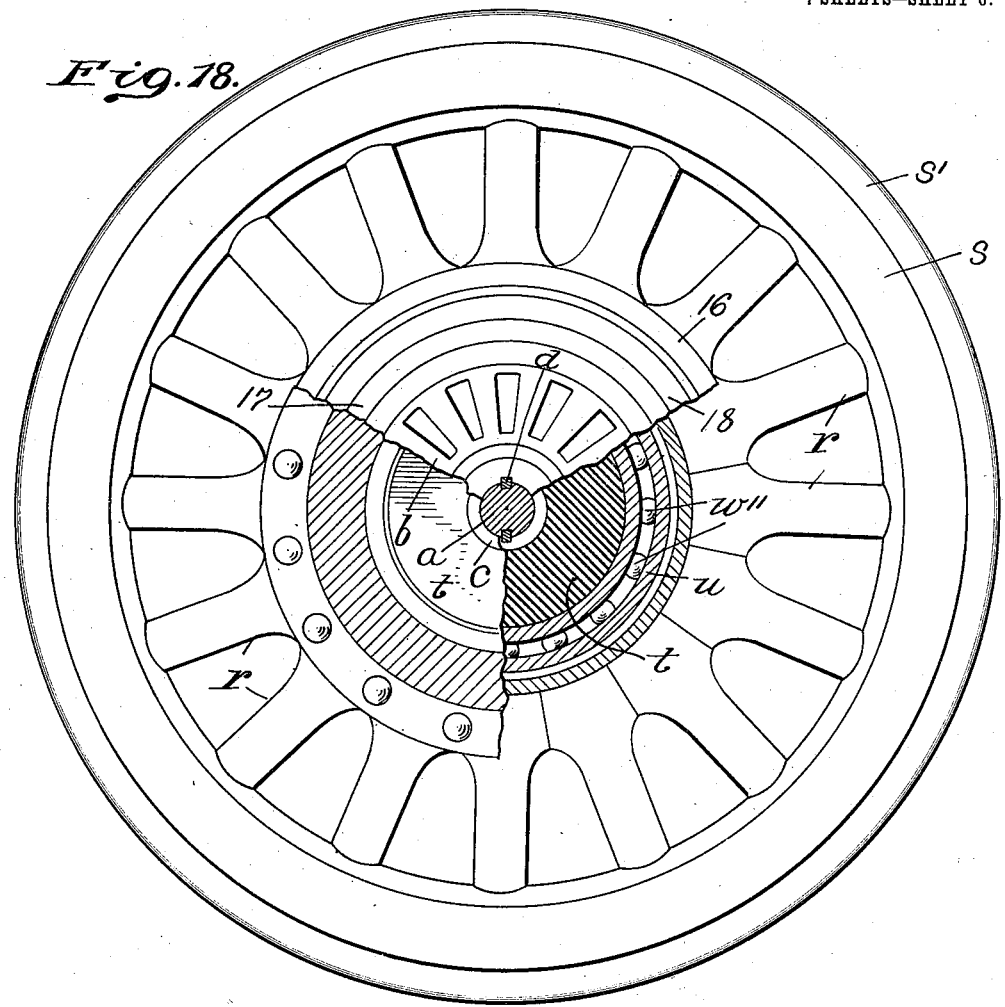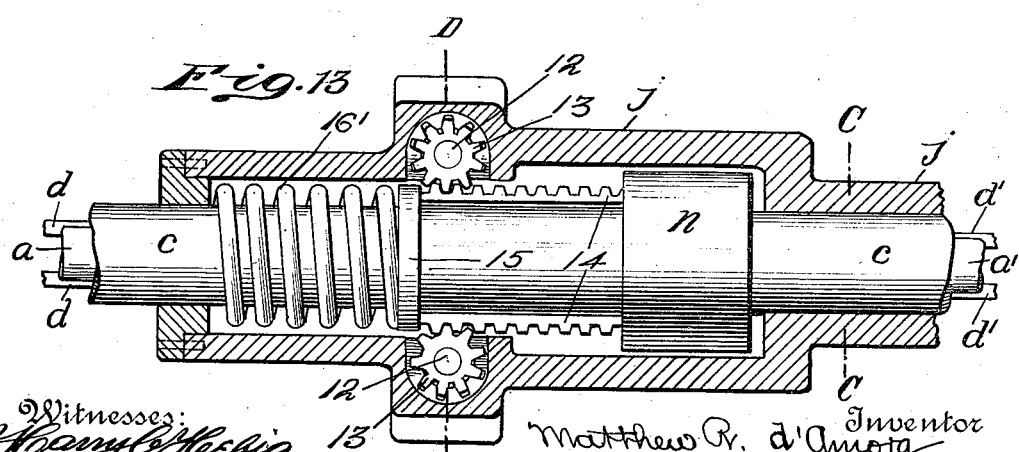

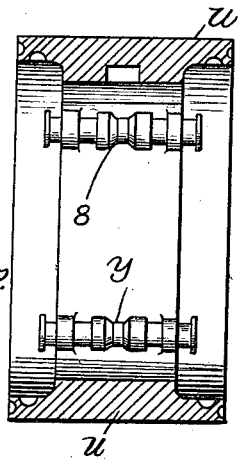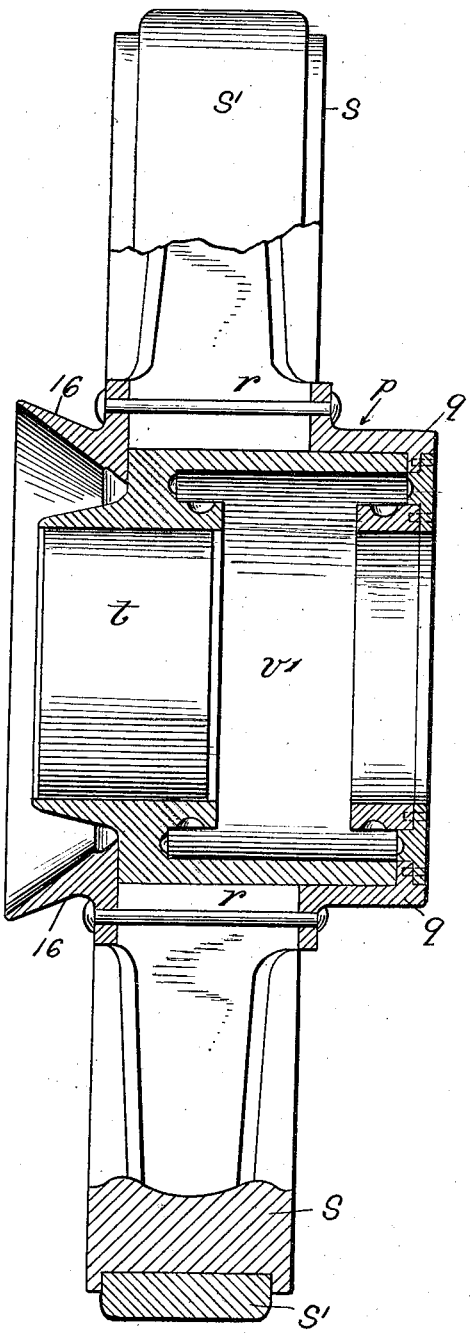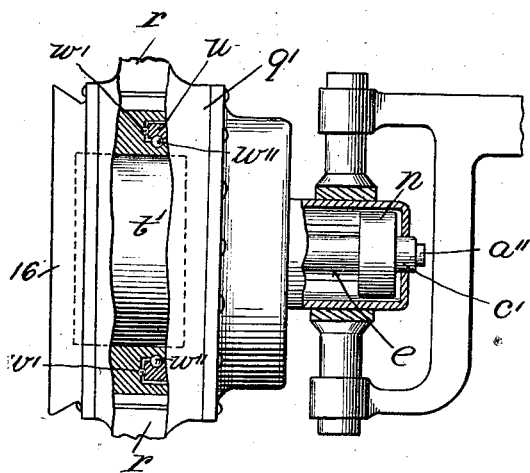

UNITED STATES PATENT OFFICE.

MATTHEW R. D'AMORA, OF NEW YORK, N. Y.

ROAD-VEHICLE.

953,312.  Specification of Letters Patent. Patented Mar. 29, 1910.

Application filed September 1, 1909. Serial No. 515,623.

*To all whom it may concern:*

Be it known that I, MATTHEW R. D'AMORA, a citizen of the United States, residing at New York city, in the county and State of New York, have invented certain new and useful Improvements in Road-Vehicles, of which the following is a specification, reference being had to the accompanying drawings.

My invention relates to improvements in road vehicles and particularly to improvements in self-propelled road-vehicles; and an object of my invention is to provide a self-propelled road-vehicle with means for automatically changing the position of one clutch-member to correspond to changes in the position of its coöperating clutch-member, in order to maintain the two members in driving contact. In the particular embodiment of my invention hereinafter set forth, one of the clutch-members is carried by the wheel and the other clutch-member is carried by the shaft or axle upon which the wheel is loosely mounted. The latter is also yieldingly mounted and due to the yielding nature of its mounting, it is free to change its position with respect to the shaft or axle which carries it; and thereby the clutch-member carried by the wheel is changed in position with respect to the clutch-member carried by the axle or shaft.

It is the purpose of the arrangement of parts hereinafter described to make the movement of the part carrying one clutch-member cause such a movement of the part carrying the coöperating clutch-member that the two clutch-members will be maintained in driving contact, while the wheel is permitted to yield due to inequalities in the roadway and like causes.

Another object of my invention is to provide a road vehicle of the character herein described with means for limiting the movement of the center of each wheel to a single plane passing through the axis of the shaft which carries the wheel. The latter being yieldingly mounted, there is, of course, a tendency of the wheel-center to move out of the line which forms the geometrical axis of the shaft which carries the wheel. By means of devices which are hereinafter described and with which my road vehicle is provided, the oscillations of the wheel-center are confined to a single plane passing through the axis of the shaft which carries the wheel. In the particular embodiment of my invention hereinafter described, these devices comprise a centering-ring which is carried within a chamber formed in the hub of the wheel, rocker-plates and link mechanism by which this centering-ring is connected through these rocker plates to the housing or casing in which the shaft is rotatably mounted (this casing being connected to the transmission casing and to the chassis of the vehicle through the vehicle springs, not shown herein).

It will be understood by all skilled in this art that the dimensions of the parts, the accuracy of their mechanical fit and the proportioning of the members to resist the stresses imposed will be such as to accomplish the result intended; that is, the compelling of the center of the wheel to move in a straight line.

Figure 2:
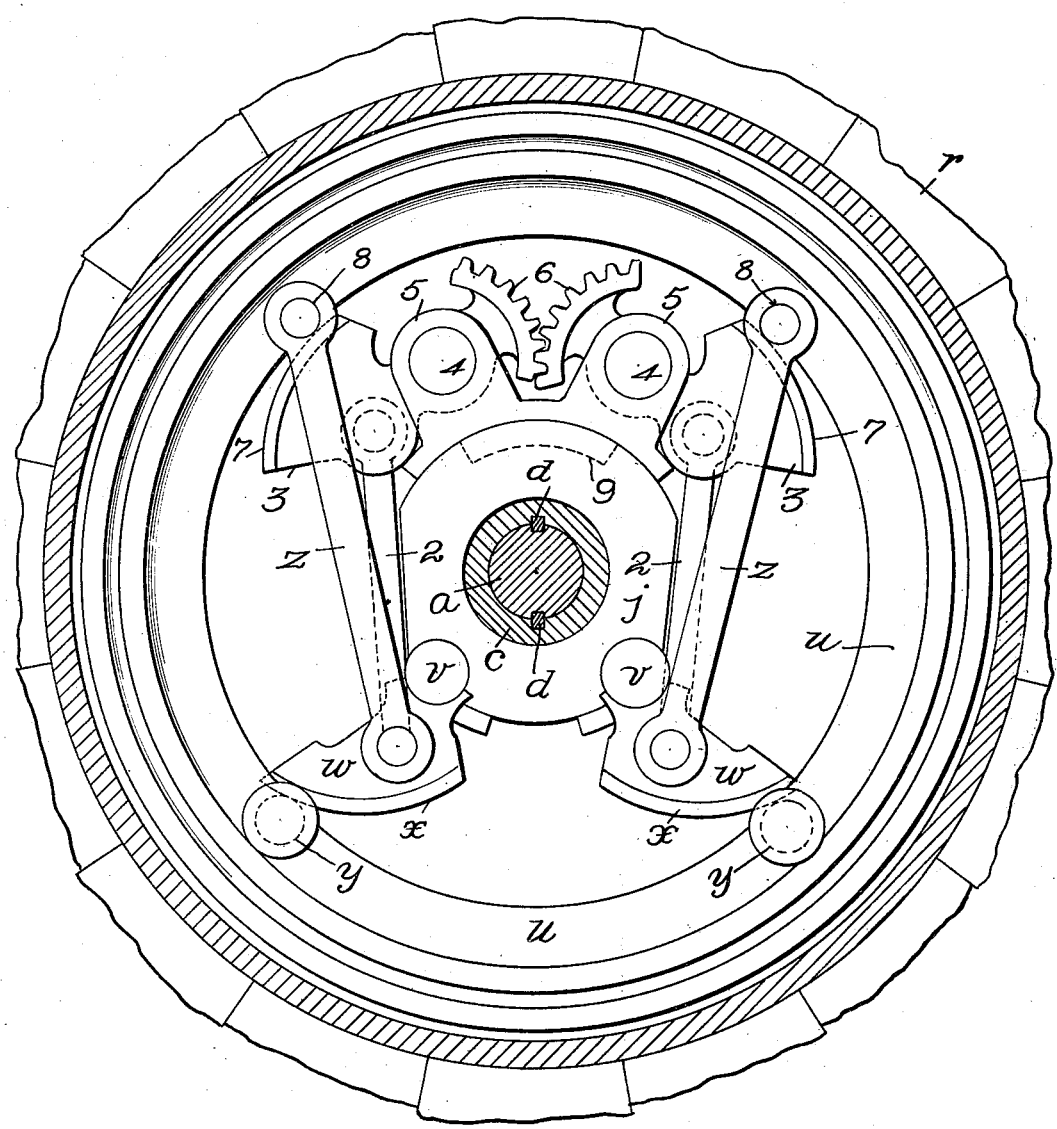
Figure 3:
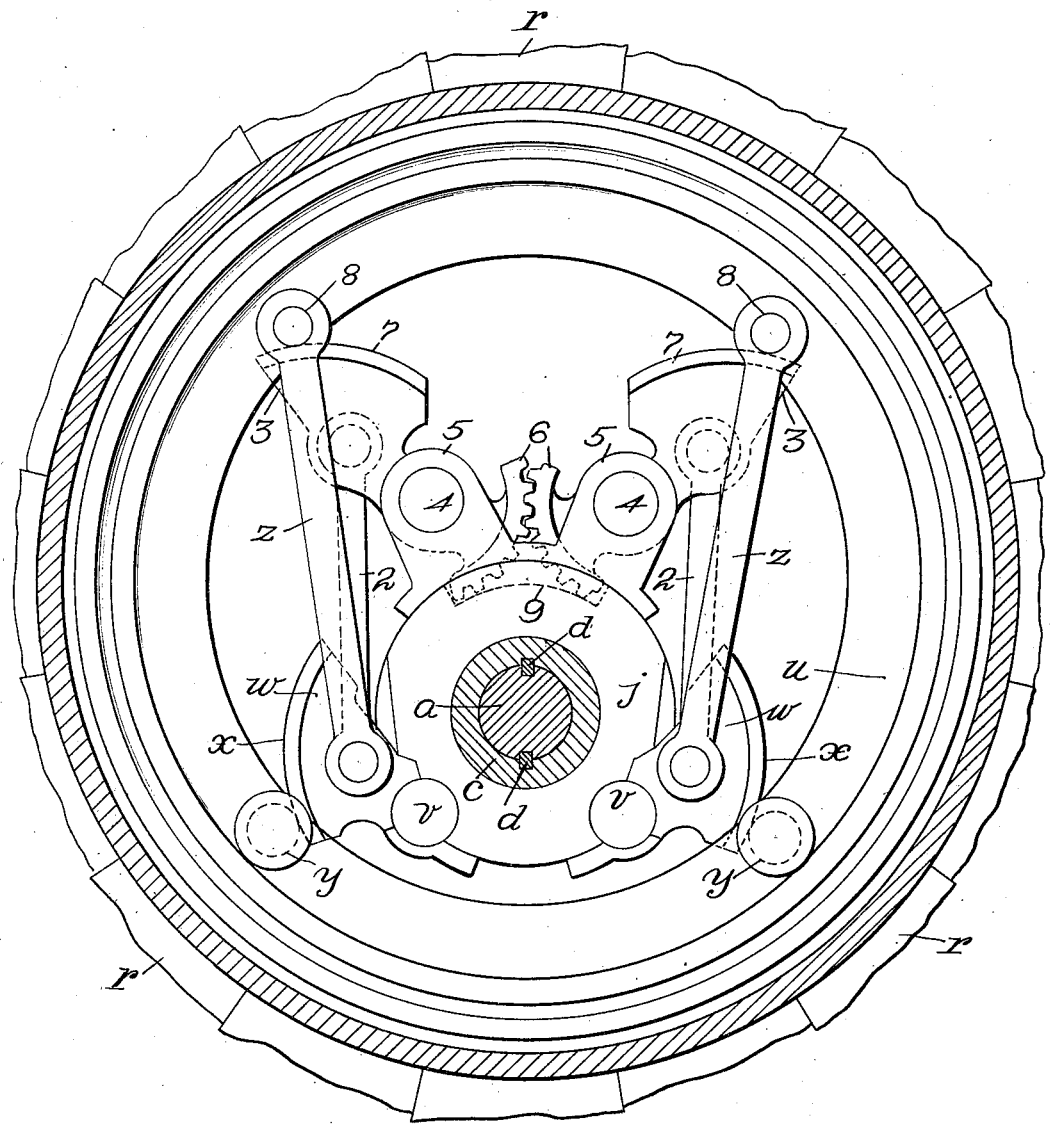

In the drawings illustrating the principle of my invention and the best mode now known to me of applying that principle, Figure 1 is a central vertical section through the clutch-shaft, wheel and clutch-members; Fig. 2 is a detail of the centering-ring and parts carried thereby; Fig. 3 is a view of the centering-ring similar to Fig. 2 but showing the parts in a different position; Figs. 4, 5 and 6 are detail views of one of the rocker-arms 3 actuated by the centering-ring; Figs. 7, 8 and 9 are detail views of one of the rocker-plates $w$; Fig. 10 is an end view of the housing $j$ which carries the rocker-plates $w$ and the rocker-arms 3; Fig. 11 is a section on the line A—A of Fig. 10; Fig. 12 is a section on the line B—B of Fig. 1; Fig. 13 is a detail, in section, of the pinions 13, racks 14 and connected parts; Fig. 14 is a section on the line C—C of Fig. 13; Fig. 15 is a section on the line D—D of Fig. 13; Fig. 16 is a detail partly in section, of the wheel; Fig. 17 is a central longitudinal section of the centering-ring; Fig. 18 is a view of the wheel in elevation and partly in section; Fig. 19 is a view showing my invention as applied to a front or driven wheel; and Fig. 20 is a view similar to Fig. 1 but showing the parts in a different position.

The driving-shaft $a'$ is keyed by the splines or feathers $d'$ to the hollow shaft or sleeve $c$ formed with longitudinal slots $e$ and keyed by the feathers or splines $d$ to the clutch-shaft $a$. On the latter is mounted fast the hub of the clutch-pulley $b$. Through the diametrically-opposed slots $e$ extend the ends of a pin $f$. The shaft $a'$ is actuated by the motor (not shown) and in turn drives the sleeve *c*, which through the pin-and-slot connection just described drives the clutch-shaft *a* and the clutch-pulley *b*. The driving shaft *a'*, sleeve *c* and clutch-shaft *a* are held within a housing *j* fastened to the transmission casing (not shown) and formed with an annular depression or groove *m* in its inner wall. Upon the sleeve *c* and in guideways *k* in the wall of the annular depression *m* is slidably fitted a hollow shifting collar or drum *n* having a chamber *o*. The pin *f* extends through a hole in the clutch-shaft *a* and is connected at its ends to and carries a ring *g* which lies in the chamber *o* and is formed with a circular groove *h* in each of its lateral faces. Balls *i* lie in the grooves *h* and between the ring *g* and the opposed lateral walls of the chamber *o* in the drum *n*. Any movement of the hollow shifting collar or drum *n* in the direction of the longitudinal axis of the clutch-shaft *a* will result in a corresponding movement of the latter.

The vehicle wheel *p* is provided with a built-up hub *q*, spokes *r*, rim *s* and tire *s'* and is carried by the outer end of the sleeve *c*, between which and the hub *q* is interposed a ring *t* of rubber or like yielding material. The hub *q* is formed with a chamber *v'* in which is carried a centering-ring *u* between which and the walls of the chamber *v'* are interposed balls *w'*, *w''*.

Movement of the wheel-hub *q* in a direction perpendicular to the longitudinal axis of the clutch-shaft *a* and resulting in the deformation of the rubber cushion *t* causes movement of the centering-ring *u* in a direction at right angles to the longitudinal axis of the clutch-shaft *a*. Pivotally mounted in the housing *j* on the rock-shafts *v*, *v*, are rocker-plates *w*, *w*, each having a curved rib or flange *x* which rests upon anti-friction rollers *y* carried by the centering-ring *u*. The latter is connected by the links *z* to the rocker-plates *w*, which are in turn connected by the links 2 to the rocker-arms 3. These rocker-arms are mounted on the rock-shafts 4 journaled in the boxes 5 upon the housing *j*. Each rocker-arm 3 is formed at its inner end with a toothed segment 6 and at its outer end with a curved guide-rib or flange 7 which bears against the anti-friction roller 8. As shown in Fig. 17, the latter is mounted in the centering-ring *u*. It will be obvious from an inspection of the drawings that as the centering-ring *u* is moved in a vertical plane due to the movement of the wheel-hub *q*, the rocker-plates *w* will be swung on the rock-shafts *v* as pivots and, through the links 2, will actuate the rocker-arms 3. The housing *j* is provided with a depression or recess 9 to permit the free inward movement of the toothed segments 6.

Each of the rock-shafts 4, to which the rocker-arms 3 are fast, carries at one end a mutilated gear 10 which meshes with a mutilated gear 11 fast upon the outer end of a shaft 12 journaled in the casing *j* and carrying near its mid-point a pinion 13. To the shifting-drum *m* are attached one end of each of a pair of rack-bars 14 the other ends of which are fastened to a slidable collar 15 between which and one end of the housing *j* is interposed a coil-spring 16' which is wound around the sleeve *c*. In mesh with the rack-bars 14 are the pinions 13; hence, when the rock-shafts 4 are rocked by the levers 3, the mutilated gears 10, through the mutilated gears 11 with which they are in mesh, turn the shafts 12 and thereby the pinions 13 so as to move the racks 14 in the direction of the longitudinal axis of the motor shaft *a*. Such movement of the racks 14 causes a movement in the same direction of the shifting-collar *n* and the ring *g* in the latter which movement is communicated through the pin *f* to the clutch-shaft itself.

The wheel-hub *q* is provided with a driving-cone 16; and to the pulley *b* is fastened an annular driving-shoe 17 faced with suitable frictional material 18. The shoe 17 frictionally drives the clutch-cone 16 and therethrough the wheel-hub *q*. It is obvious that when the wheel *p* is forced in a direction at right angles to the longitudinal axis of the clutch-shaft *a*, the latter should be moved in the direction of that axis in order to shift correspondingly the pulley *b* and therethrough the place of frictional contact between the shoe 17 and the clutch-cone 16. This lengthwise movement of the clutch-shaft *a* and resulting shifting of the pulley *b* is accomplished by the movement of the centering-ring *u*, which movement is communicated through the links *z*, 2, rocker-arms 3, rock-shafts 4, gears 10, 11, shafts 12, pinions 13, racks 14, drum *n*, ring *g* and pin *f* to the clutch-shaft *a*.

In Fig. 19 my invention is shown applied to the front axle of an automobile. Between the wheel-hub *q'* and the sleeve *c'* is interposed a cushion *t'* and movement of the wheel-hub *q'* causes a lengthwise movement of the axle or shaft *a''* in the same manner as the movement of the wheel-hub *q* produces a lengthwise movement of the clutch-shaft *a*, as hereinbefore set forth.

I claim:

1. In a road-vehicle, the combination of a wheel provided with a clutch-member; a rotary shaft upon which said wheel is carried and with respect to which the latter is free to move transversely; a second clutch-member carried by said shaft and adapted to coöperate with the first-named clutch-member; and mechanism connected with said shaft and wheel and actuated by the movement of the latter transversely of said shaft.

2. In a road-vehicle, the combination of a wheel provided with a clutch-member; a rotary shaft upon which said wheel is yieldingly carried; a second clutch-member carried by said shaft and adapted to coöperate with the first-named clutch-member; and mechanism connected with said shaft and wheel and actuated by the movement of the latter transversely of said shaft.

3. In a road-vehicle, the combination of a wheel provided with a clutch-member; a rotary shaft upon which said wheel is yieldingly carried; a second clutch-member carried by said shaft and adapted to coöperate with the first-named clutch-member; a shifting device carried by said wheel; and mechanism connecting said shaft and shifting device.

4. In a road-vehicle, the combination of a wheel provided with a clutch-member; a rotary shaft upon which said wheel is yieldingly carried; a second clutch-member carried by said shaft and adapted to coöperate with the first-named clutch-member; a shifting device carried by said wheel; and toothed mechanism connected with said device and shaft.

5. In a road-vehicle, the combination of a housing; a shaft mounted therein; a carrier device slidably mounted in said housing and connected with said shaft for carrying the same lengthwise; a wheel provided with a clutch-member and yieldingly mounted on said shaft; a second clutch-member carried by said shaft and adapted to coöperate with the first-named clutch-member; and mechanism which is connected with and actuated by said wheel and which actuates and is connected with said carrier-device.

6. In a road-vehicle, the combination of a housing; a shaft mounted therein; a carrier device slidably mounted in said housing and connected with said shaft for carrying the same lengthwise; a wheel provided with a clutch-member and yieldingly mounted on said shaft; a second clutch-member carried by said shaft and adapted to coöperate with the first-named clutch-member; and toothed mechanism which is connected with and actuated by said wheel and which actuates and is connected with said carrier-device.

7. In a road-vehicle, the combination of a housing; a shaft mounted therein; a carrier-ring slidably mounted in said housing and connected with said shaft for carrying the same lengthwise; a wheel provided with a clutch-member and yieldingly mounted on said shaft; a second clutch-member carried by said shaft and adapted to coöperate with the first-named clutch-member; and mechanism which is connected with and actuated by said wheel and which actuates and is connected with said carrier-ring.

8. In a road-vehicle, the combination of a housing; a shaft mounted therein; a carrier-ring slidably mounted in said housing; a second ring which fits slidably in said carrier-ring and is fastened to said shaft; a wheel provided with a clutch-member and yieldingly mounted on said shaft; a second clutch-member carried by said shaft and adapted to coöperate with the first-named clutch-member; and mechanism which is connected with and actuated by said wheel and which actuates and is connected with said carrier-ring.

9. In a road-vehicle, the combination of a housing; a shaft mounted therein; a wheel provided with a clutch-member and yieldingly mounted upon said shaft; a second clutch-member carried by said shaft and adapted to coöperate with the first-named clutch-member; mechanism mounted in said housing and connected with said shaft for moving the same lengthwise; and devices which are connected with and actuated by said wheel and which actuate and are connected with said mechanism.

10. In a road-vehicle, the combination of a housing; a shaft mounted therein; a wheel provided with a clutch-member and yieldingly mounted upon said shaft; a second clutch-member carried by said shaft and adapted to coöperate with the first-named clutch-member; toothed mechanism mounted in said housing and connected with said shaft for moving the same lengthwise; and devices which are connected with and actuated by said wheel and which actuate and are connected with said mechanism.

11. In a road-vehicle, the combination of a housing; a shaft mounted therein; a wheel provided with a clutch-member and yieldingly mounted upon said shaft; a second clutch-member carried by said shaft and adapted to coöperate with the first-named clutch-member; mechanism mounted in said housing and connected with said shaft for moving the same lengthwise; a shifting device carried by said wheel; and links connecting said device and mechanism.

12. In a road-vehicle, the combination of a housing; a shaft mounted therein; a wheel provided with a clutch-member and yieldingly mounted upon said shaft; a second clutch-member carried by said shaft and adapted to coöperate with the first-named clutch-member; toothed mechanism mounted in said housing and connected with said shaft for moving the same lengthwise; a shifting device carried by said wheel; and links connecting said device and mechanism.

13. In a road vehicle, the combination of a housing; a shaft mounted therein; a wheel provided with a clutch-member and yieldingly mounted upon said shaft; a second clutch-member carried by said shaft and adapted to coöperate with the first-named clutch-member; mechanism mounted in said housing and connected with said shaft for moving the same lengthwise; a shifting ring carried by said wheel; and links connecting said ring and mechanism.

14. In a road-vehicle, the combination of a housing; a shaft mounted therein; a spring-controlled carrier device slidably mounted in said housing and connected with said shaft for carrying the same lengthwise; a wheel provided with a clutch-member and yieldingly mounted on said shaft; a second clutch-member carried by said shaft and adapted to coöperate with the first-named clutch-member; and mechanism which is connected with and actuated by said wheel and which is connected with and causes movement of said carrier device.

15. In a road-vehicle, the combination of a housing; a shaft mounted therein; a spring-controlled carrier device slidably mounted in said housing and connected with said shaft for carrying the same lengthwise; a wheel provided with a clutch-member and yieldingly mounted on said shaft; a second clutch-member carried by said shaft and adapted to coöperate with the first-named clutch-member; and toothed mechanism which is connected with and actuated by said wheel and which is connected with and causes movement of said carrier-device.

16. In a road-vehicle, the combination of a housing; a shaft mounted therein; a spring-controlled carrier-ring slidably mounted in said housing and connected with said shaft for carrying the same lengthwise; a wheel provided with a clutch-member and yieldingly mounted on said shaft; a second clutch-member carried by said shaft and adapted to coöperate with the first-named clutch-member; and mechanism which is connected with and actuated by said wheel and which is connected with and causes movement of said carrier-ring.

17. In a road-vehicle, the combination of a housing; a shaft mounted therein; a spring-controlled carrier-ring slidably mounted in said housing; a second ring which fits slidably in said carrier-ring and is fastened to said shaft; a wheel provided with a clutch-member and yieldingly mounted on said shaft; a second clutch-member carried by said shaft and adapted to coöperate with the first-named clutch-member; and mechanism which is connected with and actuated by said wheel and which is connected with and causes movement of said carrier-ring.

18. In a road-vehicle, the combination of a wheel provided with a clutch-member; a shaft upon which said wheel is yieldingly mounted; a second clutch-member carried by said shaft and adapted to coöperate with the first-named clutch-member; a shifting-ring carried by said wheel; mechanism connected with said shaft for moving the same lengthwise; rocker-plates; and links which connect the latter with said shifting-ring and mechanism.

19. In a road-vehicle, the combination of a wheel provided with a clutch-member; a housing; a shaft which is mounted in said housing and upon which said wheel is yieldingly mounted; a second clutch-member carried by said shaft and adapted to coöperate with the first-named clutch-member; a shifting-ring carried by said wheel; mechanism mounted in said housing and connected with said shaft for moving the same lengthwise; rocker-plates mounted in said housing; and links which connect the latter with said shifting-ring and mechanism.

20. In a road vehicle, the combination of a wheel provided with a clutch-member; a housing; a shaft which is mounted in said housing and upon which said wheel is yieldingly mounted; a second clutch-member carried by said shaft and adapted to coöperate with the first-named clutch-member; a centering-ring carried by said wheel; toothed mechanism mounted in said housing and connected with said shaft for moving the same lengthwise; rocker-plates mounted in said housing; and links which connect the latter with said centering-ring and mechanism.

21. In a road vehicle, the combination of a wheel; a rotary shaft upon which the same is mounted free to move in a plane at right angles to the axis of the shaft independently of the latter; and mechanism which causes the center of said wheel to move in a straight line.

22. In a road vehicle, the combination of a wheel; a rotary shaft upon which the same is yieldingly mounted free to move to and from the axis of said shaft; and mechanism which causes the center of said wheel to move in a straight line.

23. In a road vehicle, the combination of a wheel; a rotary shaft upon which the same is mounted free to move to and from the axis of said shaft independently of the latter; a housing in which said shaft is mounted; and mechanism which causes the center of said wheel to follow a straight line in its movements to and from the axis of said shaft.

In testimony whereof I have hereunto set my hand in the presence of the two undersigned witnesses at New York city, New York, this thirty-first day of August, A. D. 1909.

MATTHEW R. D'AMORA.

Witnesses:
ALBERT HAMILTON,
MARGARET HAMILTON.